United States Patent [19]

Starkweather

[11] Patent Number: 5,694,227

[45] Date of Patent: Dec. 2, 1997

[54] METHOD AND APPARATUS FOR CALIBRATING AND ADJUSTING A COLOR IMAGING SYSTEM

[75] Inventor: Gary K. Starkweather, Cupertino, Calif.

[73] Assignee: Apple Computer, Inc., Cupertino, Calif.

[21] Appl. No.: 275,596

[22] Filed: Jul. 15, 1994

[51] Int. Cl.[6] .................................................. H04N 1/46
[52] U.S. Cl. .......................... 358/504; 348/187; 348/266; 348/336
[58] Field of Search .................... 348/180, 181, 348/182, 179, 175, 177, 228, 657, 266, 336, 187, 184, 185, 806, 807, 745, 746, 747; 358/504, 505, 518, 500, 506, 507, 508, 509, 527; 356/402, 406, 407, 73, 416, 419, 420; 250/252.1 A; 345/904, 150, 153; H04N 17/00

[56] References Cited

U.S. PATENT DOCUMENTS

| | | |
|---|---|---|
| 4,415,925 | 11/1983 | Tamura .................................. 358/75 |
| 4,469,433 | 9/1984 | Kurata et al. ........................... 355/4 |
| 4,776,702 | 10/1988 | Yamaba .................................. 356/419 |
| 5,257,097 | 10/1993 | Pineau et al. .......................... 358/500 |
| 5,313,291 | 5/1994 | Appel et al. ............................ 358/504 |
| 5,339,176 | 8/1994 | Smilansky et al. ..................... 358/504 |
| 5,355,180 | 10/1994 | Back ....................................... 348/164 |

*Primary Examiner*—Victor R. Kostak
*Attorney, Agent, or Firm*—Carr, DeFilippo & Ferrell

[57] ABSTRACT

A color calibration system comprises a processor for receiving and transmitting data. A first sensor coupled to the processor detects emissive color images for providing first color sampling data to the processor. A second sensor coupled to the processor detects reflective color images for providing second color sampling data to the processor. A color output device coupled to the processor is calibrated in response to data generated by at least one of the first and second sensors.

28 Claims, 6 Drawing Sheets

METHOD AND APPARATUS FOR CALIBRATING AND ADJUSTING A COLOR IMAGING SYSTEM

BACKGROUND OF THE INVENTION

1. Field of the Invention

This invention relates to color imaging systems, and more particularly to a sensor for color calibrating an imaging system, the sensor having both an emissive optical radiation transducer for measuring video display images and a reflective optical radiation transducer for measuring reflective light sources such as color printed media.

2. Description of the Background

Color imaging systems are capable of displaying and printing many varying shades of colors. Recently, color imaging systems have become increasingly sophisticated and better resolution color displays have become more readily available. As the availability and use of color imaging systems become more common, problems associated with the color accuracy of displays become more commercially important. For instance, colors on a color display are prone to drifting with temperature and age. Different color displays further exhibit different color display characteristics, which often can be quite noticeable and in some cases, user adjustable.

The different display characteristics of color displays are hard to predict and control—even the same type and model of color display can exhibit different color display characteristics. A way to ensure consistent color characteristics is to calibrate or characterize the color displays to a particular set of operating parameters.

Another problem that is also associated with color imaging systems arises in the printing of color media. Often, the colors that are displayed on a color display are not the shades of colors that are printed by the color printer. Color printing systems have a number of variables which affect color fidelity. For instance, printed color media varies depending on the type of paper material used. The paper material may be shiny, yellow office bond, thick, matted, or some other material combination. Humidity also changes the color display characteristics of a printer. Another factor which causes color variations in printers is the half-toning scheme used to achieve the different shades of colors.

From the standpoint of the user, the actual or perceived quality of a color imaging system depends on the degree to which the displayed color image appears to match the printed color media. Users of color imaging systems desire the printed color media to be an accurate reproduction of the image from the color display. The what you see is what you get (WYSIWYG) capability of a color imaging system is complicated by the color image conversion from red, green, and blue (RGB) color data to cyan, magenta, and yellow (CMY) or (CMYK where K stands for the black printer) color data. In order to display color images, the color displays utilize the three RGB color data format. Color printers, on the other hand, utilize the CMY or CMYK color data format for printing the color media. Techniques have been developed for converting the RGB color data format to the CMY color data format. U.S. Pat. No. 4,941,038, entitled "Method For Color Image Processing" describes a method for processing the RGB color data with the CMY color data.

Past color measurement systems have been comprised of color sensing elements which include optics, electrical measurement and signal conversion components, digital circuits, and software for either translating the measurements or providing communication capabilities for the color sensing device. Current color measurement devices acquire measured data in some standard form that requires reworking the measured data to another form before the color imaging system can use the measured data for actual calibration. Furthermore, these color measurement devices are often expensive, complex, and not readily accessible to the average user. Therefore, it is desirable to design a color measurement device for calibrating a color imaging system that can be used by the average user of the color imaging system which improves and overcomes the disadvantages of the prior art. The improved color measurement design should be inexpensive and affordable to an average user of the color imaging system.

SUMMARY OF THE INVENTION

In accordance with the present invention, a color calibration system comprises a color detector which receives color samples of images to provide sampling data. A processor coupled to the color detector receives the sampling data to generate a modified device profile. An output device coupled to the processor generates color output images and is responsive to the modified device profile to perform output adjustments to the output images. The sampling data includes a red sampling data, a green sampling data, and a blue sampling data. The red, green, and blue sampling data are directly processed by the processor to generate the modified device profile.

According to another aspect of the invention, the color detector is an emissive color detector which receives emissive color samples from a display device. The emissive color detector includes a first transducer having a red filter which provides red sampling data, a second transducer having a green filter which provides green sampling data, and a third transducer having a blue filter which provides blue sampling data. The processor receives the red sampling data, the green sampling data, and the blue sampling data and provides the modified device profile to the output device. The output device includes an output device profile that is updated in response to the modified device profile. The output device is a color printer that can be calibrated to render the colors of the color samples.

According to another aspect of the invention, the color detector receives reflective color samples from an article. The color detector includes a first transducer having a red filter which provides red sampling data, a second transducer having a green filter which provides green sampling data, and a third transducer having a blue filter which provides blue sampling data. The red data channel includes a red filter and a focusing lens, the green data channel includes a green filter and a focusing lens, and the blue data channel includes a blue filter and a focusing lens. The color detector includes a light source to illuminate a color sample of the article for use by the first transducer, the second transducer, and the third transducer. The color detector includes a sight access which provides visual orientation of the color detector to the article. The processor receives the red sampling data, the green sampling data, and the blue sampling data and provides the modified device profile to the output device. The output device includes an output device profile that is updated in response to the modified device profile. The output device is a display monitor. The color calibrator provides sampling data that modifies the device profile of the display monitor so that the colors of the article are rendered to the display monitor.

The present invention can also be characterized as a color sampling device comprising a first sensor which detects emissive color images to provide a first color sampling data, and a second sensor which detects reflective color images to provide a second color sampling data wherein the first color sampling data and the second color sampling data are in similar data formats. The first color sampling data and the second color sampling data are in a red, green, and blue data format. The first sensor includes a first emissive transducer having a red filter which provides a first red sampling data, a second emissive transducer having a green filter which provides a first green sampling data, and a third emissive transducer having a blue filter which provides a first blue sampling data. The second sensor includes a first reflective transducer having a red lens which provides a second red sampling data, a second reflective transducer having a green lens which provides a second green sampling data, and a third reflective transducer having a blue lens which provides a second blue sampling data.

According to another aspect of the invention, the second sensor includes an illuminating device which illuminates a sampling area to provide reflective color images to the first reflective transducer, the second reflective transducer, and the third reflective transducer. The second sensor includes a visual access to the sampling area so that the color sampling device can be placed over the sampled area.

Other aspects and advantages of the present invention can be seen upon review of the figures, the Detailed Description and the Claims which follow.

DETAILED DESCRIPTION OF THE INVENTION

Figure 1:
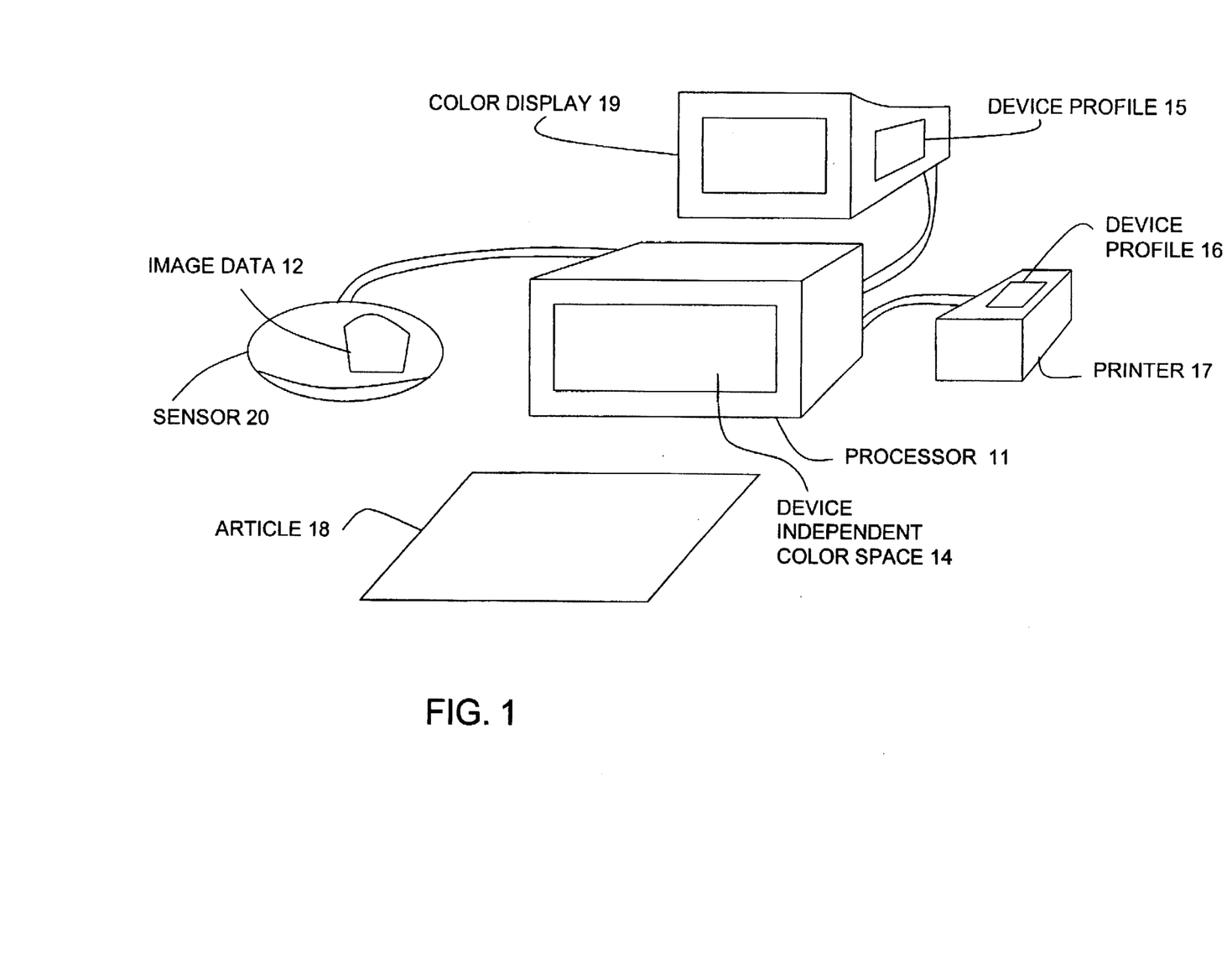
FIG. 1 depicts an embodiment of the present invention for calibrating a color imaging system.

Referring now to FIG. 1 an embodiment of a system comprising an integrated sensor 20 of the present invention is shown for calibrating and adjusting a color imaging system. The term "integrated" as used in this description applies to an optical sensor containing both emissive and reflective components in a single housing or package. Sensor 20 is coupled to processor 11 and samples article 18 to provide color image data 12 to processor 11. Processor 11 receives the color image data 12 and manipulates the color image data 12 into a device independent color space 14. Processor 11 is preferably a general purpose computer, programmed to operate on sensor 20. Processor 11 of the preferred embodiment is implemented using a PowerPC computer manufactured by Apple Computer of Cupertino, Calif. Any suitable computing device can also be equivalently used. Processor 11 transforms the device independent color space 14 to a device profile 15 for color display device 19. Similarly, processor 11 transforms the device independent color space 14 to a device profile 16 for color printer device 17. Color display device 19 and color printer device 17 are both output devices. Color display device 19 is a display monitor which provides an emissive display. The emissive display of conventional color display device 19 is achieved by an additive process. An additive process sums the available output colors to achieve a desired color. The output of the emissive display begins with the color black. As output colors are added to the output of device 19, the desired colors are achieved. Summing the available output colors achieves the color white at the output of the emissive display. Color printer device 17 is a conventional output printer which provides a color print. A color print is achieved by a subtractive process, in which dyes variously absorb portions of a white light spectrum to achieve a desired color. The output of the color printer typically begins with the white color of the paper. Available output colors are removed from the output of the color printer to achieve the desired color on the color print.

The color display of color display device 19 comprises a three-color image of red, green, and blue (RGB). The color image red provides a red output. The color image green provides a green output, and the color image blue provides a blue output. The device profile 15 is in an RGB data format and drives the color display of color display device 19. The color print of color printer device 17 comprises a three-color image of cyan, magenta, and yellow (CMY) or (CMYK, where K is black). The color image cyan is a red absorber. The color image magenta is a green absorber, and the color image yellow is a blue absorber. Thus, using the three-color image of CMY, the color red in an RGB data format is achieved by combining magenta and yellow. The color green is achieved by combining cyan and yellow, and the color blue is achieved by combining cyan and magenta. The device profile 16 in a CMY data format drives the output of color printer device 17. Other variations to color image data formats can be similarly converted. For example, RGB data format can be converted to a four-color image which includes CMY and black.

Sensor 20 of the present invention is a device that obtains color image data 12 from a display output of color display device 19, a printed output of color printer device 17, or a sample article 18. Sample article 18 is an item that reflects or emits light, including an emissive display, printed matter, a painted object, a paint sample chart, a fabric, or other similar item. Processor 11 receives the color image data 12 and processes the color image data 12 to a device independent color space 14. When a display output from color display device 19 is produced, processor 11 transforms the device independent color space 14 to a device profile 15 for color display device 19. Device profile 15 drives the display output of color display device 19. When a printer output of color printer device 17 is produced, processor 11 transforms the device independent color space 14 to a device profile 16 for color printer device 17. Device profile 16 drives the print output of color printer device 17. The device profiles 15 and 16 provide device dependent color data for driving the outputs of color display device 19 and color printer device 17.

In an example to calibrate color display device 19 to the color of a sample article 18, sensor 20 measures the colorimetric data of sample article 18 and generates color image data 12. Processor 11 receives the sampled color image data 12 from sensor 20 and transforms the sampled color image data 12 to a device independent color space 14. Processor 11 transforms the device independent color space 14 to a device profile 15. Device profile 15 contains device dependent color space data that is used to provide RGB values for driving the display output of the color display device 19. The device profile 15 calibrates the display output of color display device 19 to the color of the sample article 18. Thus, a desired color is rendered onto the color display device 19 by measuring the colorimetric data of a sample article 18.

In another example, sensor 20 is used to colorimetrically calibrate the print output of color printer device 17 with the display output of color display device 19 so that the print output of color printer device 17 accurately reproduces the colors displayed on color display device 19. Once desired colors are achieved on the color display device 19, sensor 20 obtains color image data 12 from the emissive output of color display device 19 to colorimetrically calibrate the print output of color printer device 17. The sampled color image data 12 from sensor 20 is transferred to processor 11 which transforms the sampled color image data 12 of the color display device 19 to a device independent color space 14. Processor 11 transforms the device independent color space 14 to the device profile 16 for color printer device 17. The transformed device profile 16 calibrates the print output of color printer device 17 so that the display output of color display device 19 is rendered on the print output of the color printer device 17. Although, in the preferred embodiment the processor 11 is a stand-alone general purpose computer, alternatively, color printer device 17 can include the processor 11 to transform the device independent color space 14 to the device dependent color space of device profile 16.

In another example, the color printer output of device 17 can be colorimetrically calibrated to article 18 using sensor 20. Sensor 20 generates color image data 12 from a sample article 18. Processor 11 receives the sampled color image data 12 and transforms the color image data 12 to a device independent color space 14. The device independent color space 14 is transformed to the device profile 16 for color printer device 17. The transformed device profile 16 calibrates the print output of color printer device 17 so that the colors of sample article 18 are reproduced on the print output of color printer device 17.

As will be discussed below with reference to FIG. 2, sensor 20 is capable of measuring both reflective and emissive color components. Use of sensor 20 in combination with processor 11 enables an integrated closed-loop operation between the color display device 15 and the color printing device 17.

Figure 2:
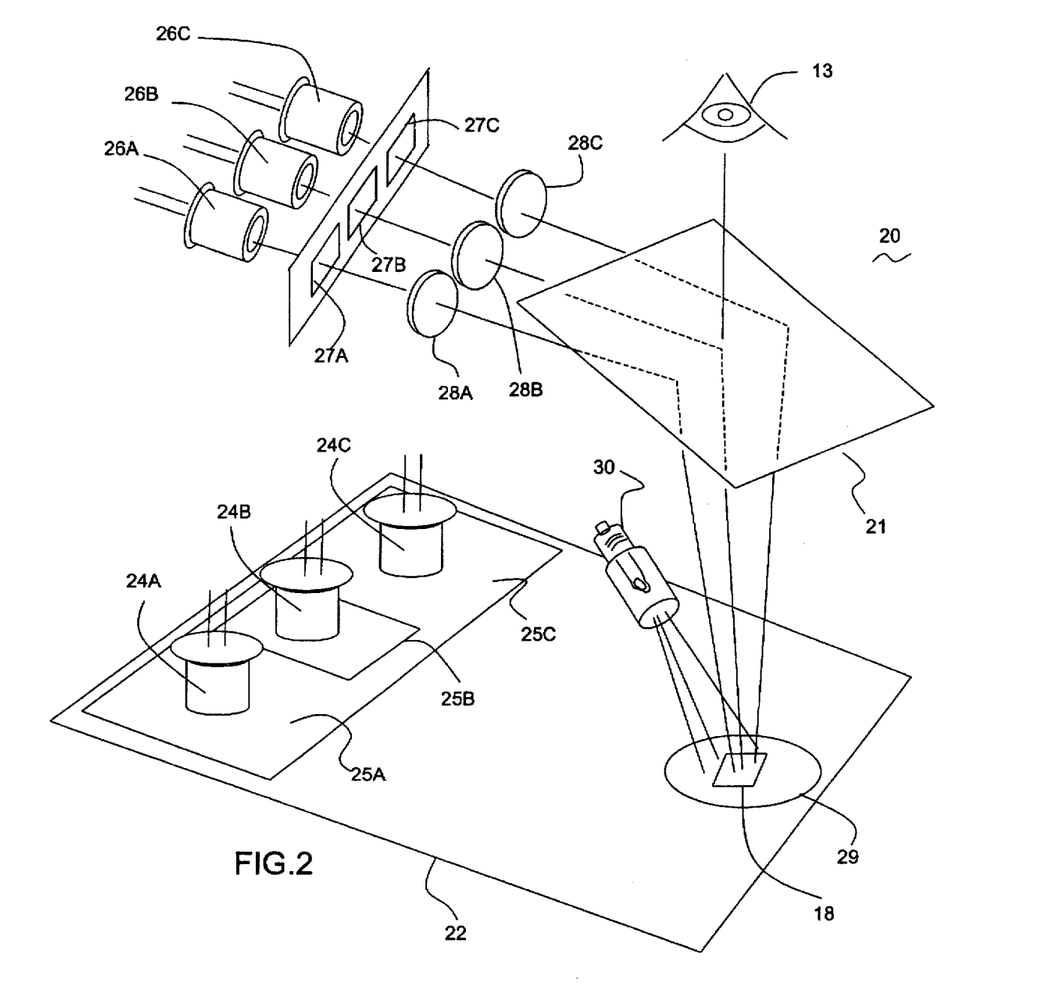
FIG. 2 depicts an embodiment of a color sensor of the present invention.

Referring now to FIG. 2, a preferred embodiment of sensor 20 is depicted, in which two sets of transducers 24, 26 are used to generate color image data 12 (FIG. 1) from the sample article 18. Each set of transducers 24, 26 contains three transducers 24(a, b, c) and 26(a, b, c) that provide RGB data format inputs to processor 11. The RGB data contains red color, green color, and blue color image data components. The first set of transducers are emissive transducers 24a, 24b, and 24c which sense data samples of article 18 that are emissive in character. Emissive data is generated by color display devices 19, and other sources that emit light. Emissive transducers 24a, 24b, and 24c are mounted to a transparent base plate 22, with RGB filters 25a, 25b, and 25c placed in front of the emissive transducers. Red filter 25a is placed in front of emissive transducer 24a. Green filter 25b is placed in front of emissive transducer 24b, and blue filter 25c is placed in front of emissive transducer 24c. The red filter 25a transmits red light. The green filter 25b transmits green light, and the blue filter 25c transmits blue light from the emissive sample of article 18. The emissive transducers 24a, 24b, and 24c provide a red transducer data output, green transducer data output, and blue transducer data output, respectively. Emissive samples of article 18 are generated by placing base plate 22 against the emissive sample of article 18. Emissive transducers 24a, 24b, and 24c sense the light given off by the emissive sample of article 18 and provide color image data 12 in response to the amount of red, green, and blue light received. The combined emissive transducer data of the emissive transducers 24a, 24b, and 24c comprise the sampled color image data 12 that is transferred to processor 11. Processor 11 transforms the color image data 12 to the device independent color space 14 as discussed below, with respect to FIG. 4.

The second set of transducers are reflective transducers 26a, 26b, and 26c, which sense samples of article 18 that are reflective in character. Reflective samples include color printed matter, and other articles that reflect color when illuminated. Reflective transducers 26a, 26b, and 26c receive reflected color light from an active reflective area 29 to obtain the color image data 12 from the reflective sample article 18. Illuminating source 30 is positioned to reflect light from the reflective sample article 18 to partial mirror 21. Partial mirror 21 directs the reflected light from the reflective sample article 18 to lenses 28a, 28b, and 28c. The lenses 28a, 28b, and 28c each concentrate the reflected light to its respective transducer 26a, 26b, and 26c. The reflected light from the reflective sample of article 18 is filtered by a red filter 27a, green filter 27b, and blue filter 27c which correspond to reflective transducers 26a, 26b, and 26c, respectively. The red filter 27a transmits red light. The green filter 27b transmits green light, and the blue filter 27c transmits blue light from the reflected sample. The reflective transducers 26a, 26b, and 26c provide a red transducer data output, a green transducer data output, and a blue transducer data output, respectively. The combined reflective transducer data of the reflective transducers 26a, 26b, and 26c comprise the sampled color image data 12 that is transferred to processor 11. Partial mirror 21 further provides a sight access for a user 13 to visually position the active area 29 of sensor 20 over the reflective sample article 18.

The embodiment of sensor 20 depicted in FIG. 2 combines the emissive transducers 24a, 24b, and 24c and reflective transducers 26a, 26b, and 26c in a single package. In practice, emissive transducers 24a, 24b, and 24c and reflective transducers 26a, 26b, and 26c can be placed in separate sensor packages. Sensor 20 can be constructed to be comprised of only the emissive transducers 24a, 24b, and 24c. Similarly, sensor 20 can be constructed to be comprised of only the reflective transducers 26a, 26b, and 26c.

Figure 3:
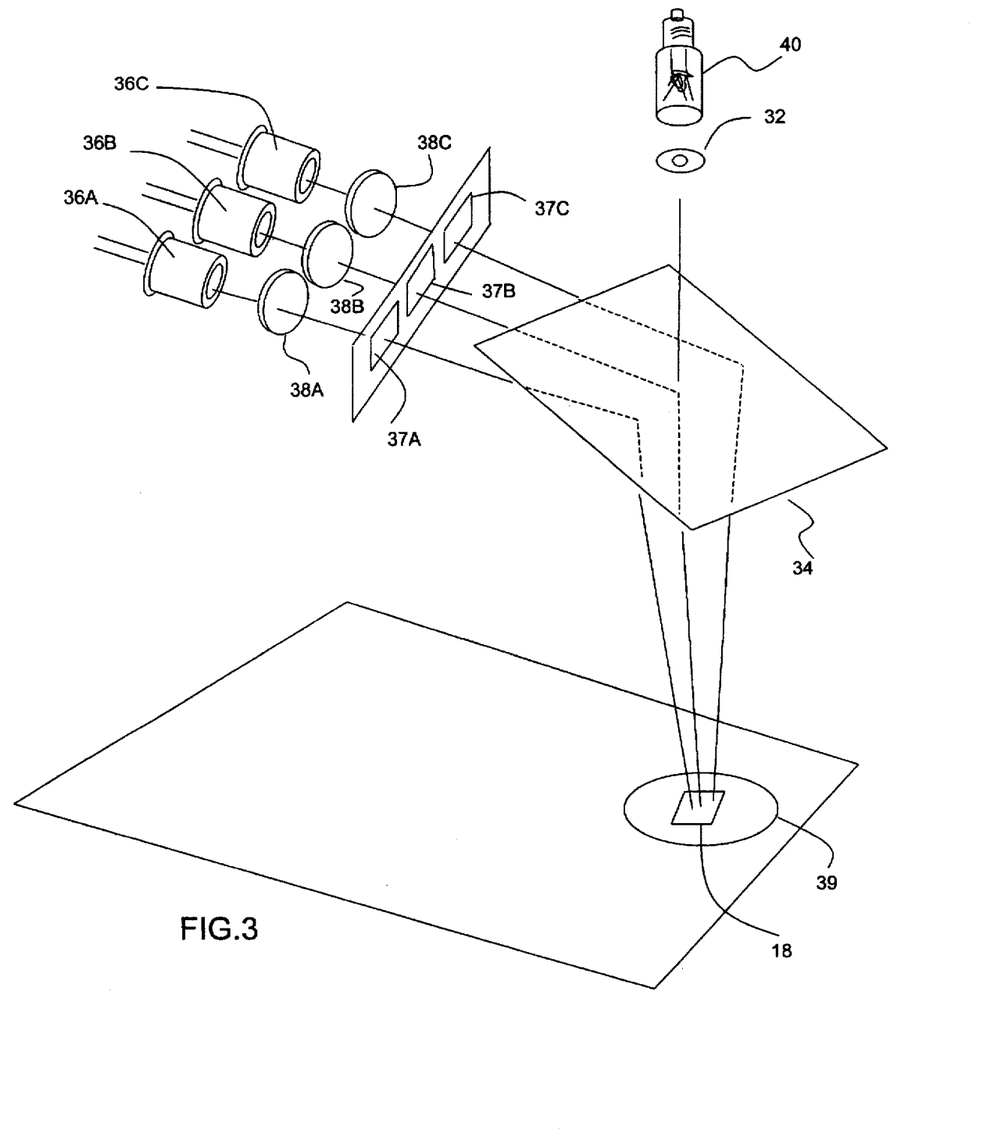
FIG. 3 depicts an alternative embodiment of a color sensor of the present invention.

Referring now to FIG. 3, an alternate embodiment comprising the reflective transducers 36a, 36b, and 36c is depicted. Illuminating source 40 is projected through lens 32 and protective plate 34. Lens 32 concentrates illumination from illuminating source 40 to pass through protective plate 34 to active reflective area 39. Reflective sample article 18 is positioned to reflect color light from the illuminating source 40. The protective plate 34 enables the user of sensor 20 to position the illumination from illuminating source 40 over the sample area 39. The underside of protective plate 34 is a partial mirror 31 which directs the reflected light from the reflective sample article 18 to red filter 37a, green filter 37b, and blue filter 37c. The red filter 37a transmits red light. The green filter 37b transmits green light, and the blue filter 37c transmits blue light from the reflected sample. Lenses 38a, 38b, and 38c concentrate the reflected light from red filter 37a, green filter 37b, and blue filter 37c to reflective transducers 36a, 36b, and 36c, respectively. Each of the reflective transducers 36a, 36b, and 36c provides a respective red transducer data output, a green transducer data output, or a blue transducer data output. The combined reflective transducer data of the reflective transducers 34a, 34b, and 34c comprise the sampled color image data 12 that is transferred to processor 11.

Figure 4:
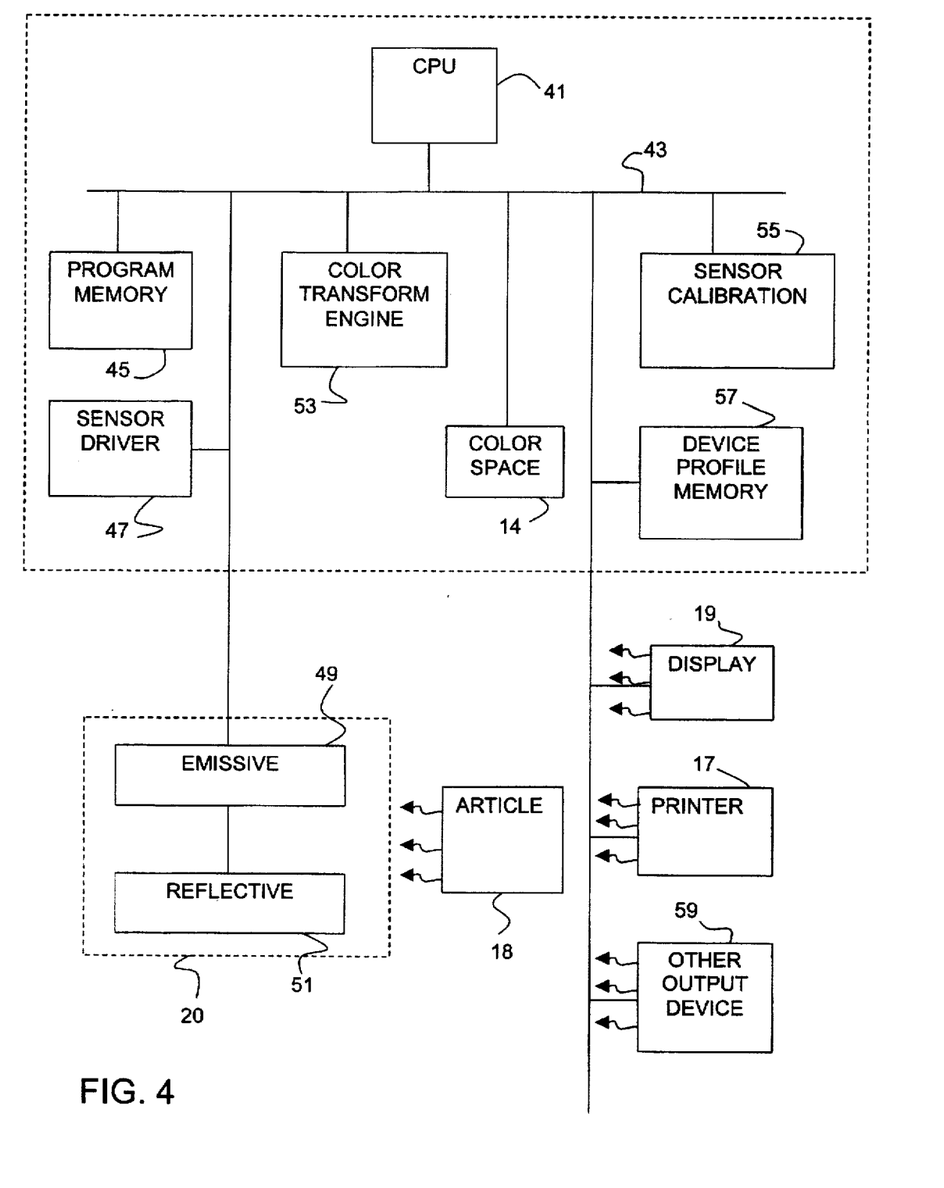
FIG. 4 is a schematic diagram showing the sensor, processor, and output devices in a preferred configuration of the present invention.

Referring now to FIG. 4, a block diagram is shown of processor 11 connected to sensor 20 and to display 19, printer 17, and other output device 59. Processor 11 is preferably a general purpose computer having a data bus 43 through which various peripheral devices can be accessed. Program memory 45 is memory storage for containing a listing of sequential program steps for instructing the general operation of CPU 41. Sensor 20 contains an emissive transducer 49 as well as a reflective transducer 51 in an integrated package. Sensor driver 47 contains programmed instructions which are executed by CPU 41 for the operation of sensor 20. This sensor driver 47 may contain such instructions as identifying for the sensor 20 the format, offset voltages, or relative intensities, in which sensor 20 is to transmit data to CPU 41. Sensor driver 47 may also instruct CPU 41 to read and transmit calibration values to CPU 41 for receiving and interpreting the color measurement data received from sensor 20.

Once sampled, image data is transmitted from sensor 20 for storage in a memory location referred to as color space 14. Image data stored in color space 14 is conventionally characterized by three parametric values. In the preferred embodiment the color parameters of hue, chroma, and intensity, are used. Hue defines the color such as red, blue or green contained in the article 18 being sampled. Chroma refers to the amount of white or black contained in the color sample, and intensity refers to the lightness or darkness of the sampled value. Other parametric values such as relative values of basic color components, or some other scheme as known in the art for storing color data may also be used. Once image data 12 is stored in color space 14, the color transform engine 53 instructs the CPU 41 to convert the color space image data into device profile 16 (FIG. 1) which is dependent on a specific output device such as the display 19, printer 17, or other output device 59. This device profile data 16 is stored in device profile memory 57, preferably as a look-up table which maps a specific color parameter to a set of conversion values which are defined for the particular output device being driven. Whenever CPU 41 transmits color image data to printer 17, for instance, the CPU sends that data to device profile memory 57 which relates to printer 17. That transmitted image data is then converted or translated using the now calibrated device profile memory 57 to produce a printer 17 image which relates to color information from the sampled data received at sensor 20. Sensor calibration memory 55 is used by CPU 41 in initially and periodically calibrating sensor 20. During sensor 20 calibration, a known color sample is used as article 18 for measurement by sensor 20. That sample article 18 is then used to make data adjustments to sensor 20. In this way, sensor 20 can itself be calibrated against a known standard and this standard information (sensor profile) can be stored in sensor calibration memory 55 to be used by sensor driver 47 in the operation of sensor 20 with processor 11.

Figure 5:
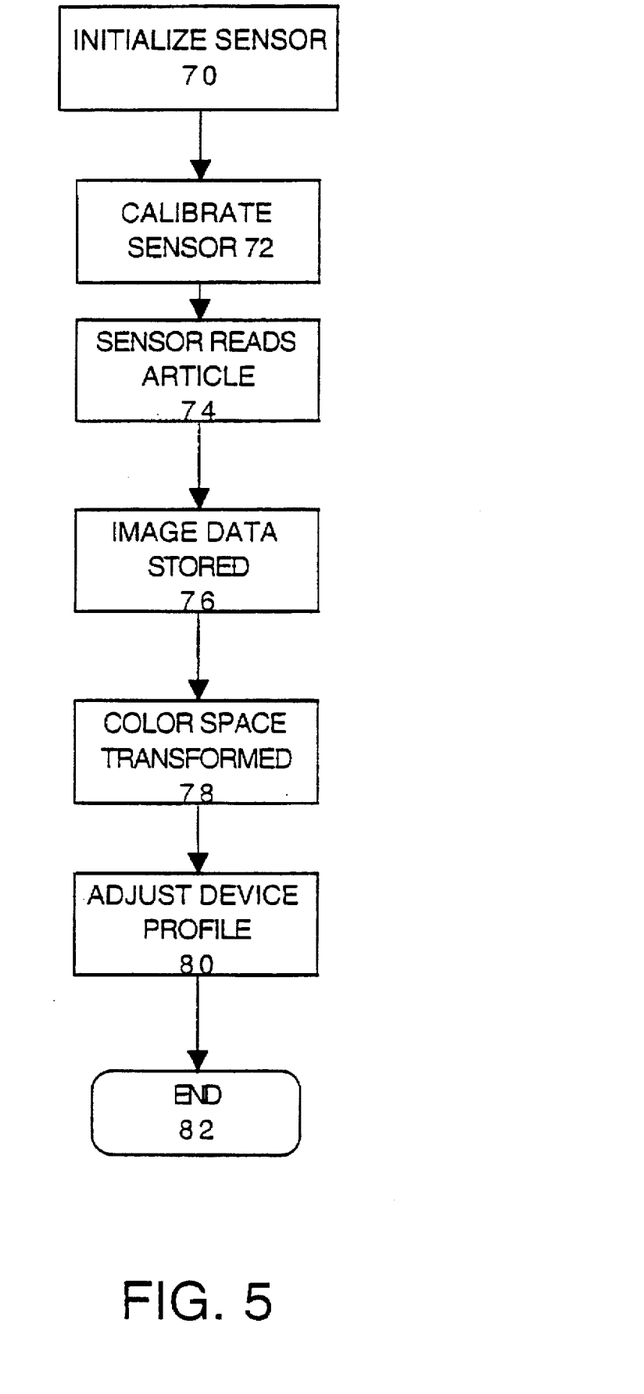
FIG. 5 is a flow chart showing a method for calibrating an output device using the sensor of FIG. 2.

Referring now to FIG. 5, a flow chart is shown of a method for calibrating an output device such as display 19, printer 17 or other output device 59, of the present invention. The method begins with initialize sensor step 70. Various control codes are sent to sensor 20 to establish a communication link between sensor 20 and the processor 11. Registers and control circuits of sensor 20 are reset during the initialize sensor step 70. A second optional initialization occurs in step 72 with the calibration of the sensor 20. Calibration of the sensor 20 is effectuated by sampling an article 18 containing a color standard, such as white, that has known colorimetric data. This calibration data sampled from the color standard is stored as sensor characteristic data in sensor calibration memory 55 and used by the color transform engine 53 when color space data as collected from the sensor is converted to device profile data and stored in device profile memory 57. Calibration step 72 is generally performed only periodically or with the first operation of the sensor 20. Beginning in step 74, sensor 20 reads an article 18 for calibration of an output device (19, 17, or 59). For the purposes of this example, the method steps of FIG. 5 will be described with respect to calibration of a display 19, although the method equivalently applies to any color output device. In step 76, image data read from sensor 20 is stored in color space 14. Since display 19 is an emissive device, the emissive transducer 49 will be used in sensor 20 to generate the image data 12 which is stored in color space 14. In step 78, color space 14 is transformed using instructions from color transform engine 53 to generate a device profile for storage in device profile memory 57. This generation of a device profile may result in a newly generated device profile or may involve only the adjustment of an existing device profile as determined by the color transform engine 53 in step 80. New display image data that is subsequently designated for output on display 19 will then be processed using the data in the device profile memory 57. The calibration of display 19 ends in step 82 and processing returns to program memory 45.

Figure 6:
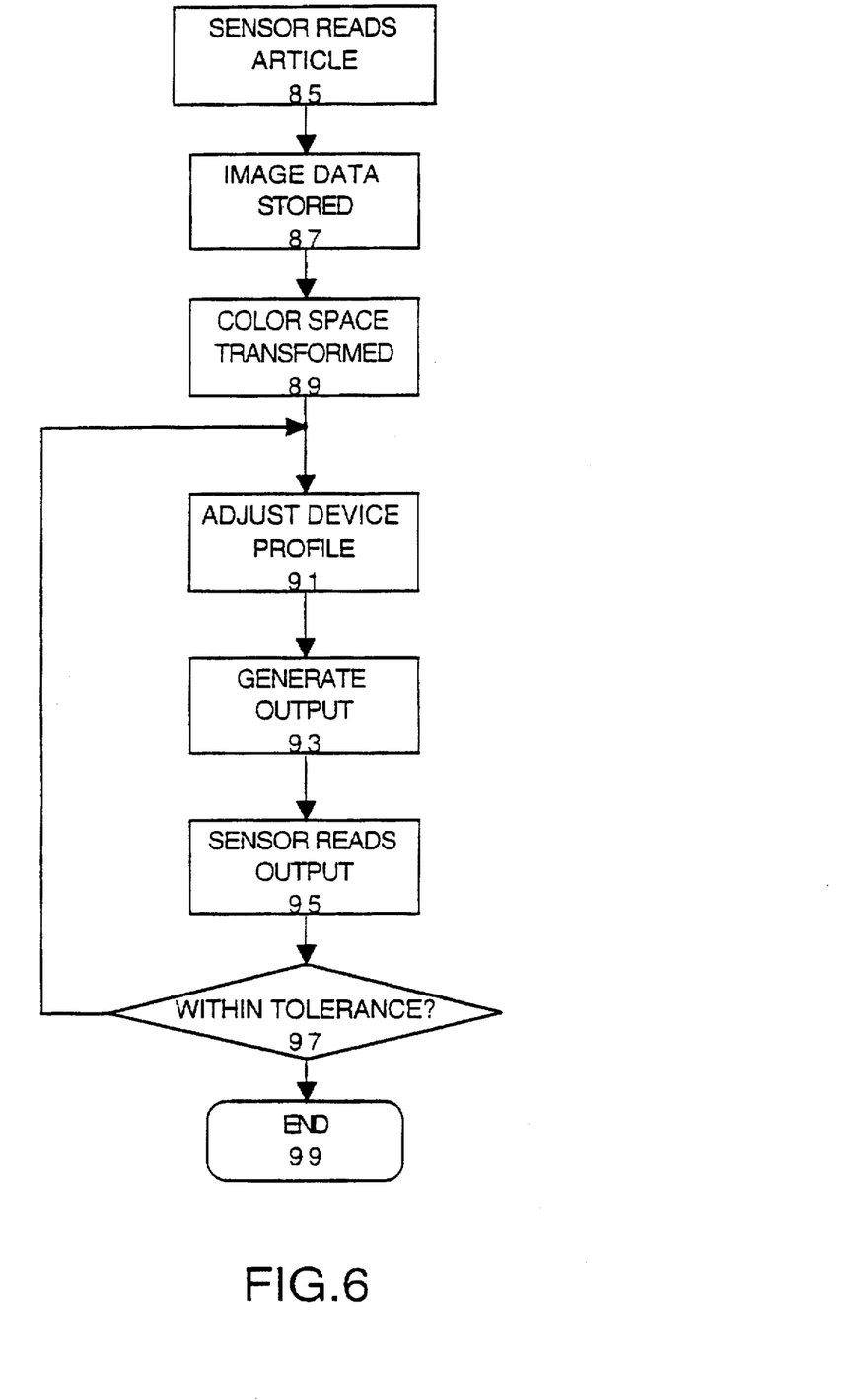
FIG. 6 is a flow chart showing a method for closed loop operation of a processor and output device using the sensor of FIG. 2.

Referring now to FIG. 6, a flow chart is shown of a method for closed loop operation of the processor 11 in conjunction with the sensor 20 and output devices (19, 17, 59). A valuable feature of the present invention is the ability to operate a color imaging system in a closed loop mode. As an example of closed loop mode, a desired color is sampled as an article 18 for output on printer 17. An exact color representation of article 18 can be generated by successively sampling the output from printer 17 using sensor 20 and adjusting the device profile stored in memory 57 until printer 17 produces an exact color replication of article 18.

The method of FIG. 6 begins in step 85 when the sensor 20 reads article 18. In step 87, image data 12 from article 18 is then transferred and stored to color space 14. The color transformation engine 53 converts the color space 14 into a device profile which is stored in device profile memory 57 in step 89. This device profile may be either a newly generated device profile or the adjustment of an existing device profile in step 91. Following the adjustment 91 of the device profile, printer 17 generates an output in step 93. This printer 17 output is then sampled using the reflective transducer 51 of sensor 20 in step 95, and a test is made by CPU 41 in step 97 to determine whether the image data resulting from the sampling of printer 17 output falls within a tolerance of the original image data 12 sampled from the original article 18. If the printer 17 output is not within a predetermined tolerance, the CPU 41 makes an adjustment to device profile memory 57, again in step 91, to further correlate the device profile memory 57 to produce a desired output result. A new output is generated in step 93 and this loop continues until an acceptable tolerance is reached and the process ends in step 99. It should be known that although this method of FIG. 6 is described with respect to a printer 17, this closed loop operation may also be effectively performed in conjunction with display 19 or other output device 59.

While the present invention has been particularly described with reference to FIGS. 1–6, and with emphasis to calibration of color outputs, it should be understood that the figures are for illustrative purposes and should not be taken as limitations on the invention. In addition, it is clear that the method and apparatus of the present invention have utility in many applications where specialized color matching between color presentation systems is desired. It is contemplated that many changes and modifications may be made by one of ordinary skill in the art without departing from the spirit and scope of the invention as disclosed.

What is claimed is:

1. A color calibration system comprising:
   a processor for receiving and transmitting data;
   a single sensor, operatively coupled with said processor, including
      a first multi-pixel area integrating sensor which detects raster-scanned emissive color energy and in response provides first color sampling data to the processor, and
      a second multi-pixel area integrating sensor which detects reflective color energy and in response provides second color sampling data to the processor; and
   a color output device which is calibrated by the processor in response to data provided by at least one of the first and second sensors.

2. The color calibration system according to claim 1, further comprising a sensor driver for instructing the processor in the operation of the first and second sensors.

3. The color calibration system according to claim 1, further comprising a color space for storing first and second color sampling data.

4. The color calibration system according to claim 3, further comprising a color transform engine for converting the stored color sampling data into output device profile data which is used in accurately producing color images at the color output device.

5. The color calibration system according to claim 1, further comprising sensor calibration memory for storing data used by the processor in calibrating the first and second sensors.

6. The color calibration system according to claim 1, wherein the color output device is a color printer.

7. The color calibration system according to claim 1, wherein the color output device is an emissive display device.

8. The color calibration system according to claim 1, wherein the first sensor further comprises:
   a first transducer having a red filter which provides red sampling data;
   a second transducer having a green filter which provides green sampling data; and
   a third transducer having a blue filter which provides blue sampling data.

9. The color calibration system according to claim 1, wherein the second sensor further comprises:
   a first transducer having a red filter which transmits red light,
   a second transducer having a green filter which transmits green light; and
   a third transducer having a blue filter which transmits blue light.

10. A method for calibrating a color imaging system comprising the steps of:
    sampling color image data, using a sensor including both an emissive transducer and a reflective transducer, from an image source;
    selecting from between said emissive transducer and said reflective transducer based on the image source;
    storing said image data to a color space;
    transforming the color space to a device profile; and
    generating a calibrated image output as defined by the device profile.

11. The method for calibrating a color imaging system according to claim 10, wherein the sensor is calibrated prior to sampling the color image data from the image source.

12. The method for calibrating a color imaging system according to claim 10, wherein following the generation of the calibrated image output as defined by the device profile, the image output is sampled and the device profile adjusted.

13. The method for calibrating a color imaging system according to claim 12, wherein the sensor comprising both an emissive and reflective transducer is used for sampling color image data from the image output.

14. A color calibration system comprising:
    means, including a sensor having both an emissive transducer and a reflective transducer, for sampling color image data from an image source;
    means for storing sampled image data to a color space;
    means for transforming the color space to a device profile; and
    means for generating a calibrated image output as defined by the device profile.

15. The color calibration system according to claim 14, comprising processor means for controlling the sensor.

16. The color calibration system according to claim 15, wherein the calibrated image output is sampled and the resulting sampled color image data is used to adjust the device profile.

17. The color calibration system according to claim 16, wherein the image output is sampled using a sensor comprising both an emissive and reflective transducer.

18. A color calibration system comprising:
    a processor for receiving and transmitting data;
    a single sensor including a first sensor which detects emissive color energy and in response provides first color sampling data to the processor and a second sensor which detects reflective color energy and in response provides second color sampling data to the processor;
    a color space for storing first and second color sampling data;
    a color transform engine for converting stored color sampling data into first and second output device profile data which is used in producing color images at the color output device; and
    a color output device which is calibrated by the processor in response to color sampling data provided by at least one of the first and second sensors, and iteratively re-calibrated by sampling output device-produced images and, in response to the sampled images, adjusting the output device profile data.

19. The color calibration system of claim 18, and further including means for selecting one of the first and second sensors which is capable of sampling the color energy that corresponds to a color sample from which said color sampling data is to be derived.

20. A color calibration system comprising:
    a sample area;
    three light sensors having respective optical axes oriented around a sample axis through said sample area;
    light beam component color focusing and filtering means including three component color channels each disposed on the axis of a respective light sensor;

a half mirror having a surface oriented to partially reflect light reflected off a sample article and traveling along said sample axis; and an illuminating source of broadband visible light directed onto said sample area.

21. The color calibration system of claim 20 wherein said illuminating source is positioned on the opposite side of said half mirror from said sample area.

22. The color calibration system of claim 21 and further comprising a lens disposed between said source and said half mirror.

23. The color calibration system of claim 20 wherein said illuminating source is positioned on the same side of said half mirror as said sample area.

24. The color calibration system of claim 23 further comprising emissive light sensor means including three component color channels, each said channel having a respective light sensor, and light beam component color filtering means; and being disposed on a respective channel axis oriented around a second sample axis through an emissive sample area.

25. A color calibration system for calibrating a color output device, comprising:

a sensor, for sampling color image data from an image source, including an emissive transducer and a reflective transducer, and transforming means, operatively coupled with said sensor, for transforming said sampled color image data into instructions for the color output device.

26. The color calibration system of claim 25, wherein said transforming means comprises:

first processor means for receiving and transmitting color image dam sampled by said sensor, second processor means for determining said instructions, and memory means for storing said instructions for said color output device.

27. The color calibration system of claim 26, wherein said transforming means further comprises a color transform engine for converting the stored color sampling data into said output device instructions which are used to produce color images at the color output device.

28. The color calibration system of claim 25, and further comprising sensor driver means for instructing the processor to receive color sampling data from one of the first and second transducers.

* * * * *

UNITED STATES PATENT AND TRADEMARK OFFICE
CERTIFICATE OF CORRECTION

PATENT NO. : 5,694,227

DATED : December 2, 1997

INVENTOR(S) : Starkweather

It is certified that error appears in the above-identified patent and that said Letters Patent is hereby corrected as shown below:

In the claims:

Claim 26, Column 12, line 9, please delete "dam" and replace it with - -data- -.

Signed and Sealed this

Fifteenth Day of June, 1999

Attest:

Attesting Officer

Q. TODD DICKINSON

Acting Commissioner of Patents and Trademarks